United States Patent
Arenas et al.

(10) Patent No.: US 9,386,105 B2
(45) Date of Patent: Jul. 5, 2016

(54) TECHNIQUES FOR DYNAMIC DOMAIN-BASED ISOLATION

(75) Inventors: Yina Arenas, Redmond, WA (US); Betty Cheuk Man Yip, Redmond, WA (US); Maxim Lukiyanov, Redmond, WA (US); Sujata Adgaonkar, Redmond, WA (US); Dale Rector, Bothell, WA (US); Dean Justus, Monroe, WA (US); Jay Rathi, Woodinville, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 0 days.

(21) Appl. No.: 13/287,172

(22) Filed: Nov. 2, 2011

(65) Prior Publication Data

US 2013/0111560 A1 May 2, 2013

(51) Int. Cl.
  H04L 29/06 (2006.01)
  H04L 29/08 (2006.01)
  G06F 17/30 (2006.01)
  H04L 29/12 (2006.01)
  G06F 21/53 (2013.01)

(52) U.S. Cl.
  CPC .......... *H04L 67/16* (2013.01); *G06F 17/30887* (2013.01); *G06F 21/53* (2013.01); *H04L 61/15* (2013.01); *H04L 61/305* (2013.01); *H04L 63/10* (2013.01); *G06F 2221/2119* (2013.01); *G06F 2221/2125* (2013.01); *H04L 63/1466* (2013.01)

(58) Field of Classification Search
  None
  See application file for complete search history.

(56) References Cited

U.S. PATENT DOCUMENTS

| | | | | |
|---|---|---|---|---|
| 6,339,423 | B1 * | 1/2002 | Sampson et al. | 715/854 |
| 6,687,746 | B1 * | 2/2004 | Shuster et al. | 709/223 |
| 6,880,007 | B1 * | 4/2005 | Gardos et al. | 709/225 |
| 6,961,783 | B1 * | 11/2005 | Cook et al. | 709/245 |

(Continued)

FOREIGN PATENT DOCUMENTS

CN 101982958 A 3/2011

OTHER PUBLICATIONS

Chen, et al., "An Analysis of Browser Domain-Isolation Bugs and a Light-Weight Transparent Defense Mechanism", Retrieved at <<http://technet.microsoft.com/en-us/library/cc287815.aspx>>, Proceedings of the 14th ACM conference on Computer and communications security, Oct. 29-Nov. 2, 2007, pp. 10.

(Continued)

*Primary Examiner* — Fatoumata Traore
*Assistant Examiner* — Khoi Le
(74) *Attorney, Agent, or Firm* — Julie Kane Akhter; Leonard Smith; Micky Minhas

(57) ABSTRACT

Techniques for dynamic domain-based isolation are described. An apparatus may comprise a domain name component operative to receive a domain name request for a uniform resource locator, the domain name component operative to resolve the domain name request 105 on a wildcard entry in a domain name table, a receiving component operative to receive a request for a web application at the uniform resource locator, the uniform resource locator having been dynamically assigned to the web application, and an application identification component operative to determine which hosted web application of a plurality of hosted web applications corresponds to the requested web application on the basis of the uniform resource locator. Other embodiments are described and claimed.

11 Claims, 8 Drawing Sheets

(56) References Cited

U.S. PATENT DOCUMENTS

| | | | | |
|---|---|---|---|---|
| 7,000,189 | B2* | 2/2006 | Dutta et al. | 715/727 |
| 7,542,468 | B1* | 6/2009 | Begley | H04L 61/2015 370/389 |
| 7,647,582 | B2* | 1/2010 | Krishnaswamy et al. | 717/120 |
| 8,190,773 | B2* | 5/2012 | Wikman et al. | 709/245 |
| 2008/0134315 | A1* | 6/2008 | Tamura et al. | 726/12 |
| 2008/0250136 | A1* | 10/2008 | Izrailevsky et al. | 709/224 |
| 2008/0270418 | A1* | 10/2008 | Chen et al. | 707/10 |
| 2009/0112814 | A1* | 4/2009 | Statia et al. | 707/3 |
| 2010/0153535 | A1* | 6/2010 | Thayer et al. | 709/223 |
| 2011/0119306 | A1* | 5/2011 | Patil | 707/783 |
| 2012/0151552 | A1* | 6/2012 | Kandasamy et al. | 726/1 |
| 2012/0198268 | A1* | 8/2012 | Qureshi | G06F 11/1443 714/4.1 |
| 2012/0278872 | A1* | 11/2012 | Woelfel | H04L 61/2596 726/7 |

OTHER PUBLICATIONS

"Logical architecture components (SharePoint Foundation 2010)", Retrieved at <<http://technet.microsoft.com/en-us/library/cc287815.aspx>>, May 26, 2011, pp. 15.

Thorpe, Danny, "Secure Cross-Domain Communication in the Browser", Retrieved at <<http://msdn.microsoft.com/en-us/library/bb735305.aspx>>, Retrieved Date: Aug. 25, 2011, pp. 7.

"Sharepoint", Retrieved at <<http://www.google.com/notebook/public/12571484088967331167/BDSUCIwoQstT0l7wj>>, Retrieved Date: Aug. 26, 2011, pp. 65.

"Deploying ASP.NET Applications", Retrieved at <<http://authors.aspalliance.com/quickstart/aspplus/doc/deployment.aspx>>, Retrieved Date: Aug. 26, 2011, pp. 3.

"Network Security Access Restrictions in Silverlight", Retrieved at <<http://msdn.microsoft.com/en-us/library/cc645032 (v=vs.95).aspx>>, Retrieved Date: Aug. 26, 2011, pp. 20.

Chen, et al., "An Analysis of Browser Domain-Isolation Bugs and a Light-Weight Transparent Defense Mechanism", Retrieved at <<http://technet.microsoft.com/en-us/library/cc287815.aspx>>, Proceedings of the 14th ACM conference on Computer and communications security, Oct. 29-Nov. 2, 2007, p. 10.

"Logical architecture components (SharePoint Foundation 2010)", Retrieved at <<http://technet.microsoft.com/en-us/library/cc287815.aspx>>, May 26, 2011, p. 15.

"Sharepoint", Retrieved at <<http://www.google.com/notebook/public/12571484088967331167/ BDSUCIwoQstT017wj>>, Retrieved Date: Aug. 26, 2011, p. 65.

"Deploying ASP.NET Applications", Retrieved at <<http://authors.aspalliance.com/quickstart/aspplus/doc/deployment.aspx>>, Retrieved Date: Aug. 26, 2011, p. 3.

"Network Security Access Restrictions in Silverlight", Retrieved at <<http://msdn.microsoft.com/en-us/library/cc645032(v=vs.95).aspx>>, Retrieved Date: Aug. 26, 2011, p. 20.

"Second Office Action and Search Report Issued in Chinese Patent Application No. 201210431499.2", Mailed Date: Nov. 30, 2015, 12 Pages.

* cited by examiner

TECHNIQUES FOR DYNAMIC DOMAIN-BASED ISOLATION

BACKGROUND

The World Wide Web (WWW) has continued to transition from a platform in which all users receive the same static content to a platform in which every user has the opportunity to customize their experience with a web site to create a page specific to them. For web portals, such as social networking sites, much of this transition has been empowered by the ability for users to customize their view of the portal by embedding third-party web applications within the larger portal page. However, allowing the embedding of third-party web applications can lead to a security risk that the web application will interfere with the operation of, or access the data of, the portal, the user, or another third-party web application. While some limited techniques exist to address these security concerns, they are frequently burdensome to a web application developer, limiting the streamlined creation and use of third-party web applications. It is with respect to these and other considerations that the present improvements have been needed.

SUMMARY

The following presents a simplified summary in order to provide a basic understanding of some novel embodiments described herein. This summary is not an extensive overview, and it is not intended to identify key/critical elements or to delineate the scope thereof. Its sole purpose is to present some concepts in a simplified form as a prelude to the more detailed description that is presented later.

Various embodiments are generally directed to techniques for dynamic domain-based isolation. Some embodiments are particularly directed to techniques for automatic and dynamic domain-based isolation of web applications embedded within a web page. Domain-based isolation may reduce or eliminate security concerns associated with web applications.

In one embodiment, for example, an apparatus may comprise an isolation application having a receiving component to receive a request for a web application at a uniform resource locator, the uniform resource locator having been dynamically assigned to the web application. The isolation application may further comprise an application identification component to determine which hosted web application of a plurality of hosted web applications corresponds to the requested web application on the basis of the uniform resource locator. Other embodiments are described and claimed.

To the accomplishment of the foregoing and related ends, certain illustrative aspects are described herein in connection with the following description and the annexed drawings. These aspects are indicative of the various ways in which the principles disclosed herein can be practiced and all aspects and equivalents thereof are intended to be within the scope of the claimed subject matter. Other advantages and novel features will become apparent from the following detailed description when considered in conjunction with the drawings.

DETAILED DESCRIPTION

Figure 1A:
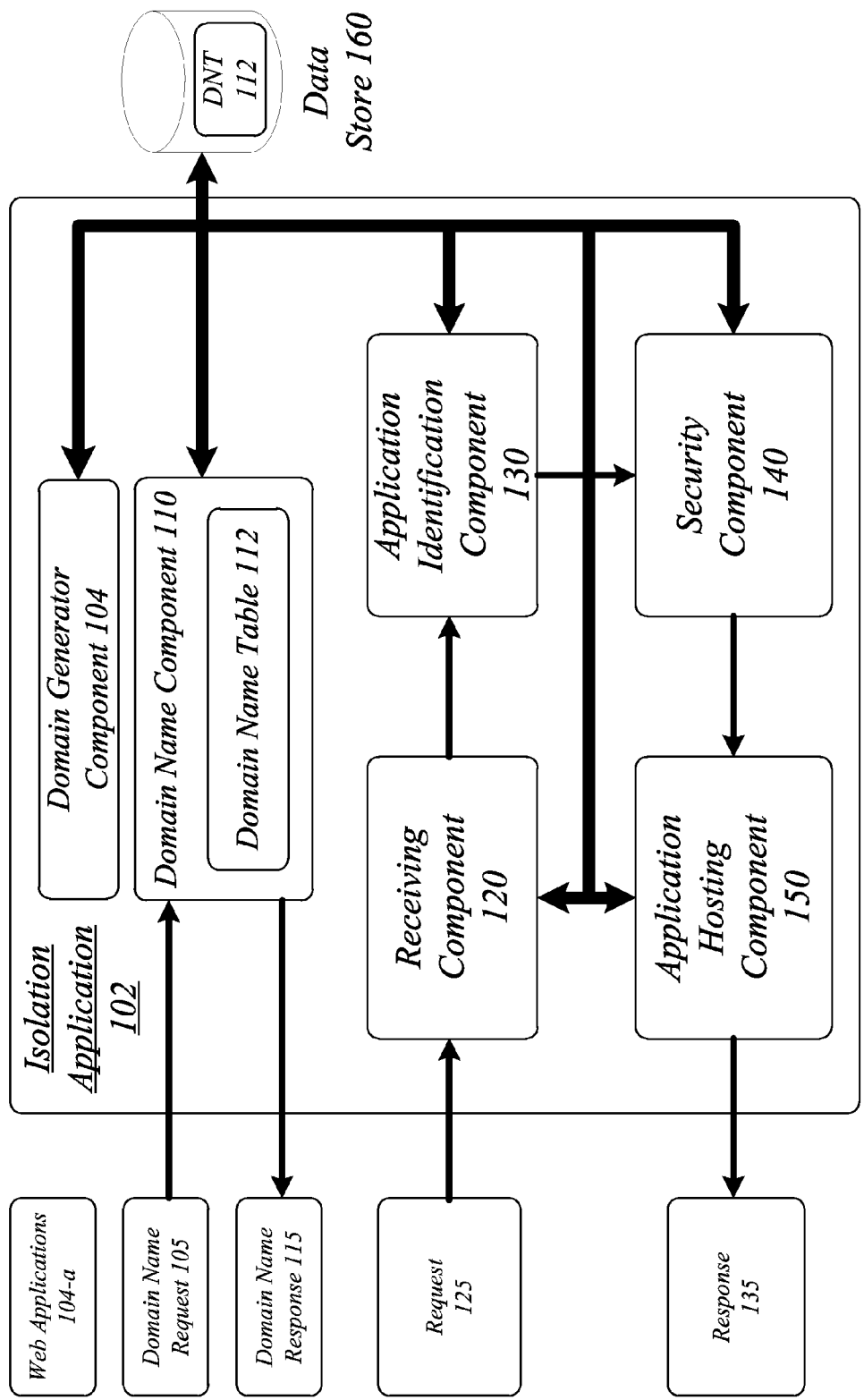
FIG. 1A illustrates an embodiment of a system for dynamic domain-based isolation.

Various embodiments are generally directed to techniques for dynamic domain-based isolation. Some embodiments are particularly directed to techniques to automatically create domains for web applications hosted by a web site to isolate web applications from other web applications or private data hosted by the web site. This alleviates web application developers from the burden of creating a domain to host a web application. As such, cost and complexity for developing and installing web applications, particularly third party applications, are reduced. Further, by eliminating the need for a hosting domain to be created by a third party, the hosting of web applications can be entirely performed by an entity hosting the web pages. This centralizes the hosting burden onto an entity which may be in a superior position to scale the hosting system. As a result, the embodiments can improve the affordability and scalability of web application development while enhancing the modularity and extendibility of a web site.

Reference is now made to the drawings, wherein like reference numerals are used to refer to like elements throughout. In the following description, for purposes of explanation, numerous specific details are set forth in order to provide a thorough understanding thereof. It may be evident, however, that the novel embodiments can be practiced without these specific details. In other instances, well known structures and devices are shown in block diagram form in order to facilitate a description thereof. The intention is to cover all modifications, equivalents, and alternatives falling within the spirit and scope of the claimed subject matter.

FIG. 1A illustrates a block diagram for an isolation system 100. In one embodiment, the isolation system 100 may comprise a computer-implemented system having one or more software applications and/or components. Although the isolation system 100 shown in FIG. 1A has a limited number of elements in a certain topology, it may be appreciated that the isolation system 100 may include more or less elements in alternate topologies as desired for a given implementation.

The isolation system 100 may implement various techniques for dynamic domain-based isolation. More particularly, the isolation system 100 may isolate one or more web applications 104-$a$, where $a$ represents any positive integer. For instance, the isolation system 100 may isolate a web application 104-1 implemented by a web site from a web application 104-2 implemented by the same web site by automatically generating separate domains for the web applications 104-1, 104-2. Domain-based isolation reduces or prevents the web applications 104-1, 104-2 from accessing or corrupting each other. Domain-based isolation also reduces or prevents the web application 104-1 or the web application 104-2 from accessing or corrupting other data hosted by the same web site, such as private or public user data, web parts, frame data, or other hosted content.

A web application 104-*a* may generally comprise an application accessed and rendered using a web browser. Some web applications 104-*a* may be standard or mostly-standard software applications that are accessed via a browser, such as a Java application or Java applet. These types of web applications 104-*a*, by virtue of being a fully-featured applications merely hosted within a browser, may largely operate according to a security model for data access appropriate for standard computer applications. Some web applications 104-*a*, however, are implemented using a scripting language or a combination of a scripting language and a markup language, such as JavaScript used in combination with hypertext markup language (HTML). These scripted applications can be rendered within a frame of a larger web page, such as an iframe in hypertext markup language (HTML) or extensible markup language (XML), so that they appear embedded in the web page with other content beside that provided by the web application 104-*a*. This latter sort of scripted version of web application 104-*a*, by virtue of being written in a language supported directly by the web browser (e.g., a client-side scripting language), can raise security concerns. Managing the security permissions of a scripted version of a web application 104-*a* embedded in a web page falls directly on the server system hosting the web application 104-*a* and the particular web browser rendering the web application 104-*a*. Of particular value is security solutions which leverage security features present in the few commonly-used web browsers, such as Microsoft® Internet Explorer®, Google® Chrome®, Apple® Safari®, and Mozilla® Firefox®, among others.

In particular, the growing use of the WWW for tasks that previously would have been handled by applications native to a personal computer has increased both user demands for access to a wider variety of web applications 104-*a* and the need for these web applications 104-*a* to strictly comply with security restrictions. The increased user demand can be met by allowing for third-party web applications to be embedded in a web site and by lessening the burden on those who develop third-party web applications. A third-party web application may be one developed by an entity other than the hosting entity responsible for the hosting web page. From another perspective, a third-party web application is a type of web application 104-*a* to which the hosting entity responsible for the hosting of the web page is not willing to extend sufficient trust that security precautions are not required. In some cases, web applications 104-*a* developed by the hosting entity may be treated as third-party web applications in order to gain a restriction on how much damage a malfunctioning or improperly coded application can cause. In other cases, web applications 104-*a* developed by the hosting entity may be treated as third-party web applications in order to create a level marketplace for web application developers, with in-house web applications 104-*a* implemented in the same manner as third-party web applications 104-*a*. This may be particularly desirable when the third-party web applications are part of a commercial marketplace, such as a for-pay marketplace of web applications 104-*a*.

Web applications 104-*a* can pose a security risk, however, to web sites that contain user data that individual users may wish to protect, such as social networking portals, for example. For instance, a user may wish to see a stock ticker when they visit a social networking portal, and may be willing to allow a third-party stock ticker application access to a list of owned stocks maintained by the portal, but may also wish to prevent the stock ticker application from having access to contact information, the email addresses of friends, or any other personal information unrelated to the task of displaying a stock ticker. One solution to this problem is to require that all third-party web applications be hosted on a separate domain from the hosting web page. Many modern browsers implement a same origin policy (SOP) which blocks web pages in a first domain from accessing data from a second domain. This SOP functionality is applied to web applications 104-*a* hosted within frames, such as iframes, so that a web application 104-*a* embedded in a frame in a given domain is unable to access data from any other domain. As such, third-party web applications are typically implemented using a distinct domain name from the hosting web page and from each other to effectively isolate each third-party web application from accessing data of the hosted web page or other embedded web applications 104-*a*.

However, having third-party applications hosted on a separate domain may place a burden on developers to create and maintain their own domain. This increases the development cost of web applications 104-*a*, resulting in higher prices for commercial web applications and reduced development of free web applications. If the hosting entity were able to dynamically create a domain for the third-party application itself, however, this burden is removed from developers, thereby reducing prices for the consumers of commercial web applications, and expanding the number of developers able to afford to create free web applications. Further, by eliminating the need for a hosting domain to be created by the third party, the hosting of web applications 104-*a* can be entirely performed by the hosting entity controlling the primary web page, thereby centralizing the hosting burden onto an entity which may be in a superior position to scale the hosting system.

The isolation system 100 solves these and other problems utilizing dynamic domain-based isolation techniques. As shown in the illustrated embodiment of FIG. 1A, the isolation system 100 includes an isolation application 102 communicatively coupled to a data store 160. The isolation application 102 may comprise, among other software elements, a domain generator component 104, a domain name component 110, a receiving component 120, an application identification component 130, a security component 140, and an application hosting component 150.

In general, the domain generator component 104 is arranged to automatically generate a domain for a web application 104-*a*. For instance, the domain generator component 104 may generate a domain for a web application 104-*a* during installation of the web application 104-*a* on a host web site by a user. The domain name component 110 is arranged to receive a domain name request 105 for a reference to a network resource, such as a uniform resource locator (URL), for example. The domain name component 110 may resolve the domain name request 105 based on a wildcard entry in a domain name table 112, and send a domain name response 115 in response to the domain name request 105. The receiving component 120 is arranged to receive a request 125 for a web application 104-*a* at the URL, the URL having been dynamically assigned to the web application 104-*a*. The application identification component 130 is arranged to determine which hosted web application 104-*a* of a plurality of hosted web applications 104-*a* corresponds to the requested web application 104-*a* on the basis of the URL. The security component 140 is arranged to determine a set of security permissions for the web application 104-*a*, the security component 140 to apply the security permissions to the received request 125. The application hosting component 150 is arranged to return a response 135 to the request 125 using the web application 104-*a*.

In various embodiments, the domain generator component 104 is arranged to automatically generate a domain for a web application 104-*a*. As previously described, when installing a web application 104-*a* on a web portal, whether developed by a host entity for the web portal or a third party developer, the web application 104-*a* needs a separate domain for security purposes. This domain is typically generated by a user or the developer of the web application 104-*a*, thereby increasing cost and complexity for deploying the web application 104-*a*. To reduce or eliminate associated cost and complexity, the domain generator component 104 may automatically generate a domain for a web application 104-*a* as part of the set of installation operations used to install the web application 104-*a* on a web server. In addition to reducing cost and complexity for a user or developer, this dynamic domain generation provides some unique advantages to the web server, such as having fine control over how each domain is generated for a web application 104-*a* and/or a user. For instance, the domain generator component 104 may generate a domain using an algorithm that reduces a time needed to perform and resolve domain name system (DNS) searches by the domain name component 110. This may be of particular value in large-scale hosting scenarios in which the responsiveness of the domain name system is a limiting factor in performance.

In various embodiments, domain name component 110 is generally arranged to receive a domain name request 105 for a URL. The URL comprises, as part of the URL, a domain name. This domain name will have been dynamically assigned to the web application 104-*a* by the domain generator component 104. In some embodiments, the URL will have been dynamically assigned to the web application 104-*a* at installation. In some embodiments, this dynamic assignment may comprise generating a unique domain name for the web application 104-*a* at the time it is installed into a web page for a user. This may be part of a process in which a user selects a web application 104-*a* from a web application hub, such as a web application store, for installation into a web page, such as a user web page at a web portal. After installation, the installed web application 104-*a* will be included with requests by a user for the user web page, such as by embedding the installed web application 104-*a* into a frame of the user web page. In some embodiments, the installed web application 104-*a* will be installed to a web page that multiple users access. In these cases, the installed web application 104-*a* will be included with requests by a plurality of users for the common web page, such as by embedding the installed web application 104-*a* into a frame of the common web page. Alternatively, in cases where a common web page is individually customized by individual users, a unique uniform resource locator for each installed application allows for an identification of not just which web application 104-*a* originated a request but which user that installed web application 104-*a* is associated with. As such, the response 135 to a request 125 generated for a web application 104-*a* may be customized to a particular user, such as by drawing from stored information specific to that user, even when the web application 104-*a* was installed to a user's particular version of a common web page.

In some embodiments, the URL may comprise a domain name comprising a user-specific identifier and an application identifier. The combined application identifier and user-specific identifier may result in a unique domain name for a particular installation of the web application 104-*a*.

The application identifier may be generated for the web application 104-*a* during installation. The application identifier may a number of a set length, such as six digits, generated through a process designed to ensure that the application identifier will be unique among those used for the particular user. In some embodiments, the application identifier may be created by generating a random number at the time a user account is created, with the first installed web application 104-1 assigned the random number, and each subsequently installed web applications 104-2, 104-3 . . . 104-*a* assigned a number in sequence following the random number. For example, if the random number was 123456, then a first application identifier may comprise 123457, a second application identifier may comprise 123458, and so forth in sequence. Alternatively, the application identifier can be randomly generated for each installed web application 104-*a* using a random number generation mechanism that guarantees uniqueness of each application identifier.

The user-specific identifier may be specific to a particular user of the web portal. The user-specific identifier may correspond to a registered user name or any other sequence of characters which can be used to uniquely identify a user. In one embodiment, for example, the user-specific identifier may comprise a globally unique identifier (GUID) for the user.

Combining a user-specific identifier with an application identifier may create a unique sub-domain of a hosting domain for the hosting entity. For example, if a previously-installed web application 104-1 for a user with the user-specific identifier JohnYoung had the application identifier 123456, the combined application identifier could be JohnYoung-123457, with "123457" being the next number in sequence after "123456." If the web application 104-1 were hosted on a hosting domain GlobalAppShare.net, the full URL for this installation of the web application 104-1 would therefore be as follows:

JohnYoung-123457.GlobalAppShare.net

It will be appreciated that a number of techniques for combining a user-specific identifier and an application identifier into a combined application identifier can be envisioned. The embodiments are not limited in this context.

In various embodiments, the domain name component 110 may resolve a domain name request 105 to produce a domain name response 115 comprising a network address, such as an Internet Protocol (IP) address, for the installed web application 104-*a*. The domain name component 110 may maintain a domain name table 112 in the data store 160 with an entry for each domain name managed by the domain name component 110. However, a domain name table 112 with a large number of entries may need a relatively large amount of memory or cache space to store the domain name entries, which can increase the cost and reduce the performance of a domain name component 110. This issue may be aggravated if a unique domain name entry is made for each installed application. To alleviate this, a wildcard entry may be used for each user-specific identifier, with all of the installed web applications 104-*a* for that user-specific identifier, corresponding to the installed web applications 104-*a* for the user, being resolved according to that single wildcard entry. This process may comprise creating a wildcard entry for each user-specific identifier as each user-specific identifier is created. The domain name component 110 may therefore be arranged to examine each received domain name request 105 to determine whether the received domain name request 105 matches the established pattern for domain names for installed web applications 104-*a* and, if so, resolve the domain name request 105 by performing a search for the wildcard entry for the user-specific identifier.

To continue with the previous example above, a domain name request 105 for the web application 104-1 having a URL JohnYoung-123457.GlobalAppShare.net may be resolved by a wildcard entry for JohnYoung-*.GlobalAppShare.net. As such, the wildcard entry in the domain name table 112 may comprise a single entry for a plurality of web applications 104-*a* for a user, wherein a unique URL was dynamically assigned for each of the plurality of web applications 104-*a* at the time of installation. It will be appreciated that other wildcard entries may be used, such as a wildcard entry which resolves all installed web applications 104-*a* for all users to a single domain.

In various embodiments, the wildcard entry may comprise a wildcard subdomain with an identifier portion and a wildcard portion. The identifier portion may be a user-specific identifier, a user-specific identifier concatenated with a defined separator character or characters such as the dash used in the example above, or may generally comprise a user-specific identifier. The wildcard portion may comprise an asterisk character, as in the example above, or any other symbol or method of indicating a portion of a subdomain available for wildcard matching. A requested subdomain matches the wildcard subdomain if the requested subdomain contains the identifier portion of the wildcard subdomain and if any characters within the requested subdomain beyond those matching the identifier portion are contained with the portion of the wildcard subdomain available for wildcard matching as indicated by the wildcard portion. If either of these conditions are not met, the requested subdomain does not match the wildcard subdomain. A domain name request 105 will match a wildcard entry if the requested domain name matches the wildcard entry including the wildcard subdomain, matched as described above.

In some embodiments, the wildcard portion may comprise a specific required number of characters, wherein a requested subdomain only matches the wildcard subdomain if the number of characters within the requested subdomain beyond those matching the identifier portion is the specific required number of characters. In these embodiments, the application identifiers will be assigned as having this specific required number of characters. Alternatively, the wildcard portion may allow for any number of characters, or may allow for multiple specific numbers of characters, such as an allowed range.

In various embodiments, the receiving component 120 is generally arranged to receive and process a request 125 for a web application 104-*a* at the URL, the URL having been dynamically assigned to the web application 104-*a*. As described above, each installed web application 104-*a* has a domain name unique to the installation of that web application 104-*a* to a particular user. As described above, this unique domain name is automatically and dynamically generated and assigned to the web application 104-*a* by the isolation application 102 during installation of the web application 104-*a*. The receiving component 120 may forward some or all of the requests 125 to the application identification component 130. In some embodiments, the receiving component 120 may forward only those requests which match the established pattern for domain names for installed web applications 104-*a*, as described above, to the application identification component 130, and refrain from forwarding those requests which do not match the established pattern to the application identification component 130. In this manner, the receiving component 120 may operate to filter requests 125 suitable for performing a search for the wildcard entry for the user-specific identifier, from those that are suitable for normal domain name searching techniques.

In various embodiments, the application identification component 130 is generally arranged to determine which hosted web application 104-*a* of a plurality of hosted web applications 104-*a* corresponds to the requested web application 104-*a* on the basis of the URL. Each installed web application 104-*a* has a domain name unique to the installation of that web application 104-*a* to a particular user. The application component 130 may extract a user-specific identifier and an application identifier from the URL and use this information to identify which web application 104-*a* corresponds to the extracted user-specific identifier and application identifier. Continuing with the previous example, a received URL of JohnYoung-123457.GlobalAppShare.net would have the user-specific identifier "JohnYoung" and the application identifier "123457" extracted, which together uniquely identify an installed web application 104-*a*. It will be appreciated that, as described above, in some embodiments the application identifier only identifies the web application 104-*a* when used in conjunction with the user-specific identifier, as a different application identifier may be generated for each installation of a particular web application 104-*a* by different users. As such, the same web application 104-*a* may likely not have the same application identifier if installed by two independent users.

In various embodiments, the security component 140 is generally arranged to determine a set of security permissions for the web application 104-*a*, the security component 140 to apply the security permissions to the received request 125. The security component 140 may determine the set of security permissions by performing a lookup in a look-up table (LUT) stored in the data store 160, or in some embodiments in a separate data store, based on the user-specific identifier and the application identifier, so as to determine a specific set of permissions for the installed web application 104-*a*. In some embodiments, this may allow for different users of the same web application 104-*a* to specify different security permissions for their particular installation of the web application 104-*a*. For example, a first user may allow an installed web application 104-1 to access a list of contacts, while a second user denies access to the list of contacts. In some embodiments, each web application 104-*a* may have a set of permissions common across all installations of the web application 104-*a*. In these embodiments, a web application 104-1 may specify a set of permissions required for the use of the application, with each additional installation of the web application 104-1 having this same set of permissions. For example, the web application 104-1 may comprise a birthday reminder application and specify that it makes use of a user's contact listings, which in this example is to pull birthday dates for reminding the user of birthdays. This set of permissions may have been transmitted to the hosting entity prior to the time the web application 104-1 is made available for installation by users. The security component 140 may allow an installed web application 104-1 to only have access to those portions of data, such as private user data, that are allowed by the set of security permissions for the web application 104-1. For instance, a web application 104-2 may not have access to the user's contact listings. It will be appreciated that a number of known techniques exist for managing the access of web applications 104-*a* installed within frames to data. The embodiments are not limited in this context.

The application hosting component 150 is generally arranged to return a response 135 to a request 125 using the web application 104-*a*. As described above, the web application 104-*a* will have been identified on the basis of the unique domain name associated with a particular installation of the web application 104-*a*. It will be appreciated that a number of known techniques exist for responding to requests for a web application 104-*a* embedded within the frame of a page. It will be appreciated that the ability of the isolation system to uniquely identify a web application 104-*a* may aid the application hosting component 150 in performing multi-tenancy hosting functions. In some embodiments, the web applications of a plurality of developers will be hosted by a shared, though potentially distributed, hosting environment. In such a shared hosting environment, the ability to unique identify a web application 104-*a* may aid in the virtual partitioning of data or hosting configuration, such as by using the unique identification of a web application 104-*a* to uniquely identify what developer, originator, or hosting client is responsible for the web application 104-*a*. In various embodiments, application hosting component 150 may be operative to modify, customize, or otherwise make use of an identified hosting client for a web application 104-*a* in the hosting of web application 104-*a*. For example, the developer or distributor of a web application 104-*a* may be relevant to hosting configuration settings related to billing, contractual performance guarantees, or any other agreed-upon or otherwise predetermined settings related to a particular developer or distributor. The embodiments are not limited in this context.

Figure 1B:
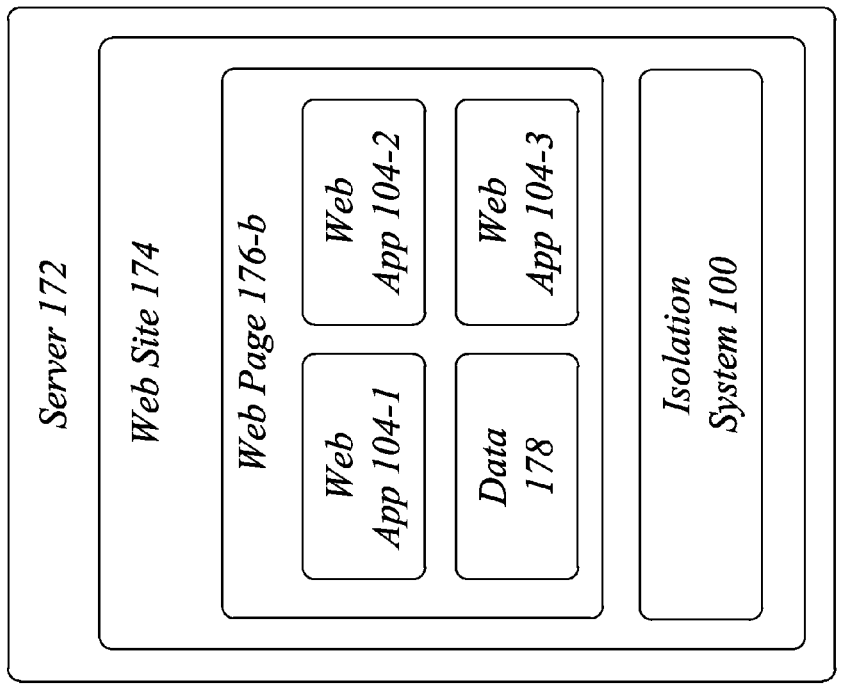
FIG. 1B illustrates an embodiment of an operating environment for dynamic domain-based isolation.

FIG. 1B illustrates a block diagram for an operating environment 170 suitable for the isolation system 100. In the operating environment 170, a server 172 may implement various web technologies to host a web site 174. The web site 174 may comprise one or more web pages 176-*b*, where b represents any positive integer. A web page 176-*b*, such as a web page 176-1, may comprise various constituent pieces, including a web application 104-1, a web application 104-2, a web application 104-3, and user data 178. Each of the web applications 104-1, 104-2, and 104-3 may be implemented in different domains as generated by the isolation system 100. Each of the web applications 104-1, 104-2, and 104-3 may have different origins and may originate from different developers. The different domains provide domain-based isolation to prevent web applications 104-1, 104-2 and 104-3 from accessing, modifying, or corrupting each other and/or user data 178.

Included herein is a set of flow charts representative of exemplary methodologies for performing novel aspects of the disclosed architecture. While, for purposes of simplicity of explanation, the one or more methodologies shown herein, for example, in the form of a flow chart or flow diagram, are shown and described as a series of acts, it is to be understood and appreciated that the methodologies are not limited by the order of acts, as some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all acts illustrated in a methodology may be required for a novel implementation.

Figure 2A:
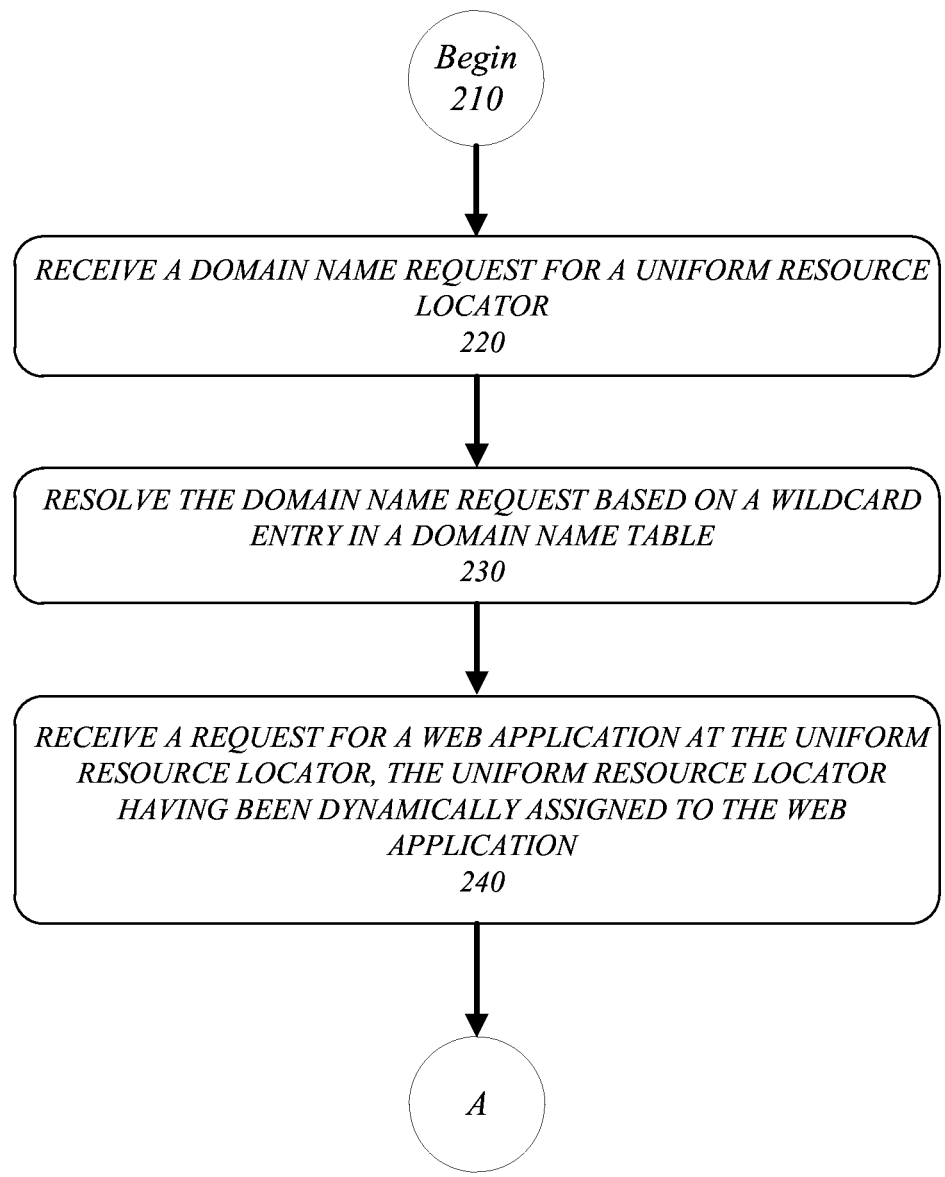
FIG. 2A illustrates an embodiment of a logic flow for dynamic domain-based isolation.

FIG. 2A illustrates one embodiment of a logic flow 200. The logic flow 200 may be representative of some or all of the operations executed by one or more embodiments described herein. For example, the logic flow 200 may represent operations for the isolation system 100.

Operations for the logic flow 200 are initiated at block 210.

The logic flow 200 receives a domain name request 105 for a URL at block 220. The URL comprises, as part of the URL, a domain name. This domain name will have been dynamically assigned to a web application 104-*a*, such as web application 104-1. In some embodiments, for example, the URL will have been dynamically assigned to the web application 104-1 by the isolation system 100 when the web application 104-1 is installed as part of a web page 176-1 the web site 174. In some embodiments, this dynamic assignment technique may comprise generating a unique domain name for the web application 104-1 at the time it is installed into the web page 176-1 for a user. This may be part of a process in which a user selects the web application 104-1 from a web application hub, such as an online web application store, for installation into the web page 176-1, such as a user page at a web portal. After installation, the installed web application 104-1 will be included with requests 125 by the user for the web page 176-1, such as by embedding the web application 104-1 into a frame of the web page 176-1.

In some embodiments, the URL may comprise a domain name comprising a user-specific identifier and an application identifier, the application identifier having been generated for the web application 104-1 at installation, and the user-specific identifier specific to a particular user of the web portal. The combined application identifier and user-specific identifier may form a unique domain name for this particular installation of the web application 104-1. The user-specific identifier may correspond to a registered user name or any other sequence of characters which can be used to uniquely identify a user. The application identifier may a number of a set length, such as six or fourteen digits, generated through a process ensuring that the application identifier will be unique among those used for the particular user. In some embodiments, the application identifier will have been generated for the web application 104-1 at installation.

The logic flow 200 resolves the domain name request 105 based on a wildcard entry in a domain name table at block 230. A domain name table 112 may be maintained with an entry for each domain name managed by the domain name component 110. The domain name component 110 may use a wildcard entry for each user-specific identifier, with all of the installed applications 104-*a* for that user-specific identifier, corresponding to the installed web applications 104-*a* for the user, being resolved according to that single wildcard entry. This technique may comprise creating a wildcard entry for each user-specific identifier as each user-specific identifier is created. Therefore, each received domain name request 105 may be examined to determine whether the received domain name request 105 matches the established pattern for domain names for installed web applications 104-*a* and, if so, the domain name request 105 may be resolved by performing a search for the wildcard entry for the user-specific identifier.

The logic flow 200 may receive a request 125 for the web application 104-1 at the URL, the URL having been dynamically assigned to the web application 104-1, at block 240. As described above, the installed web application 104-1 has a domain name unique to the installation of that web application 104-1 to a particular user. As described above, this unique domain name is dynamically generated and dynamically assigned to the web application 104-1. Some or all of the requests 125 may be forwarded for application identification. In some embodiments, only those requests 125 which match the established pattern for domain names for installed web applications 104-*a* may be forwarded, as described above, for application identification, while those requests which do not match the established pattern are not forwarded for application identification.

Figure 2B:
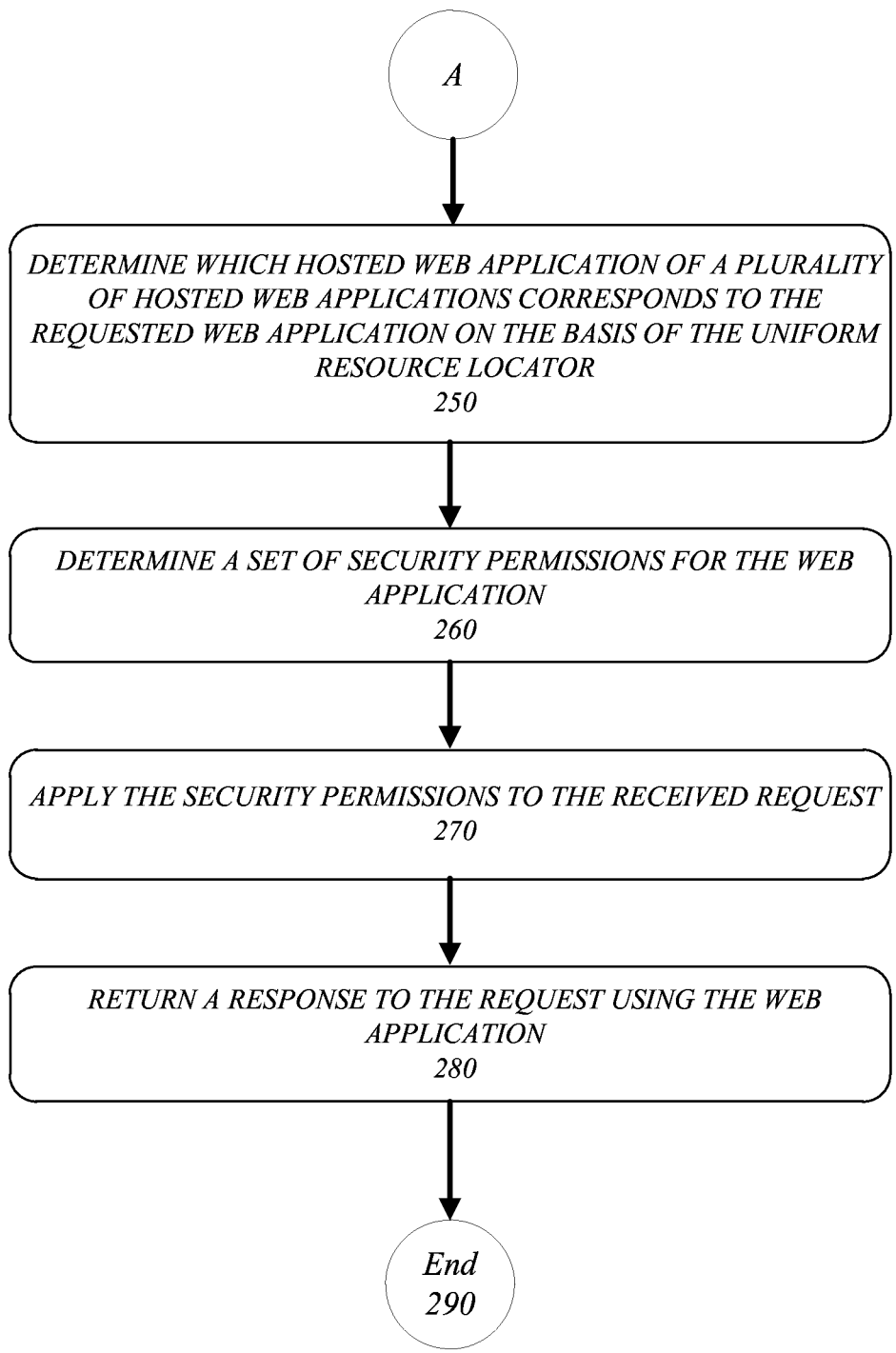
FIG. 2B illustrates an embodiment of a logic flow for dynamic domain-based isolation.

FIG. 2B illustrates a continuation of the logic flow 200 from control point A as shown in FIG. 2A. Control point A merely represents a transition between FIGS. 2A, 2B between block 240 and block 250, and not necessarily a separate logic flow from the logic flow 200.

The logic flow 200 determines which hosted web application 104-1 of a plurality of hosted web applications 104-*a* corresponds to the requested web application 104-1 on the basis of the URL at block 250. The installed web application 104-1 has a domain name unique to the installation of that web application 104-1 to a particular user. The user-specific identifier and the application identifier may be extracted from the URL to identify which web application 104-1 corresponds to the extracted user-specific identifier and application identifier.

The logic flow 200 may determine a set of security permissions for the web application 104-1 at block 260. The set of security permissions may be determined by performing a lookup based on the user-specific identifier and the application identifier, so as to determine a specific set of permissions for the installed web application 104-1. In some embodiments, this may allow for different users of the same web application 104-1 to specify different security permissions for their particular installation of the web application 104-1. For example, a first user may allow an installed web application 104-1 to access a list of contacts, while a second user denies access to the list of contacts. In some embodiments, each web application 104-1 may have a set of permissions common across all installations of the web application 104-1. In these embodiments, a web application 104-1 may specify a set of permissions required for the use of the web application 104-1, with each installation of the web application 104-1 having this same set of permissions.

The logic flow 200 may apply the security permissions to the received request 125 at block 270. The installed web application 104-1 may be allowed to only have access to those portions of data, such as private user data 178, allowed by the set of security permissions for the web application 104-1. The security permissions may be stored in a LUT managed by the data store 160.

The logic flow 200 may return a response 135 to the request 125 using the web application 104-1 at block 280. As previously described, the web application 104-1 will have been identified from among a plurality of web applications 104-a on the basis of the unique domain name associated with a particular installation of the web application 104-1.

Figure 3:
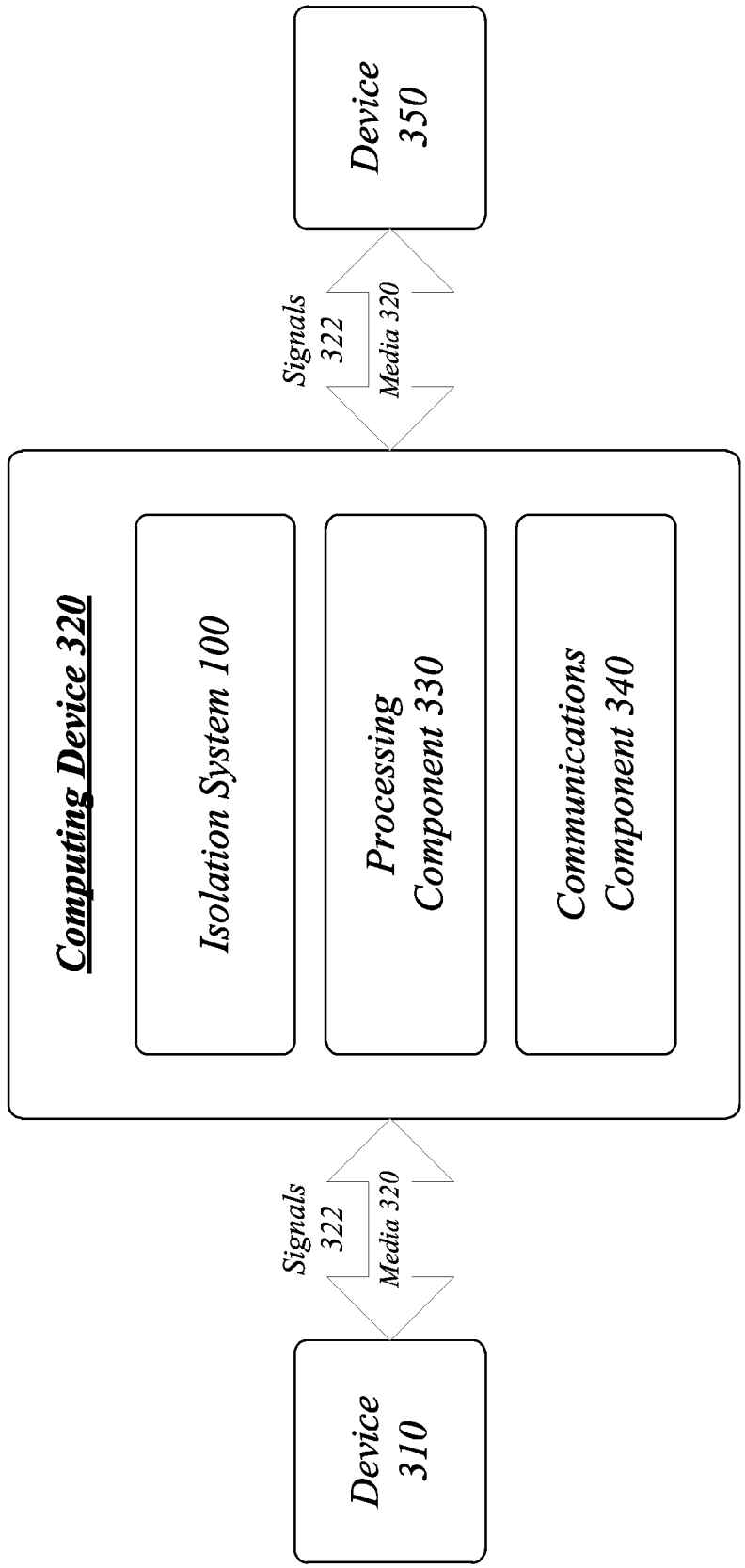
FIG. 3 illustrates an embodiment of a centralized system for dynamic domain-based isolation.

FIG. 3 illustrates a block diagram of a centralized system 300. The centralized system 300 may implement some or all of the structure and/or operations for the isolation system 100 in a single computing entity, such as entirely within a single computing device 320. An exemplary computing architecture for the computing device 320 is described with reference to FIG. 5.

The computing device 320 may execute processing operations or logic for the isolation system 100 using a processing component 330. The processing component 330 may comprise various hardware elements, software elements, or a combination of both. Examples of hardware elements may include devices, logic devices, components, processors, processor circuits, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

The computing device 320 may execute communications operations or logic for the isolation system 100 using communications component 340. The communications component 340 may implement any well-known communications techniques and protocols, such as techniques suitable for use with packet-switched networks (e.g., public networks such as the Internet, private networks such as an enterprise intranet, and so forth), circuit-switched networks (e.g., the public switched telephone network), or a combination of packet-switched networks and circuit-switched networks (with suitable gateways and translators). The communications component 340 may include various types of standard communication elements, such as one or more communications interfaces, network interfaces, network interface cards (NIC), radios, wireless transmitters/receivers (transceivers), wired and/or wireless communication media, physical connectors, and so forth. By way of example, and not limitation, communication media 320 includes wired communications media and wireless communications media. Examples of wired communications media may include a wire, cable, metal leads, printed circuit boards (PCB), backplanes, switch fabrics, semiconductor material, twisted-pair wire, co-axial cable, fiber optics, a propagated signal, and so forth. Examples of wireless communications media may include acoustic, radio-frequency (RF) spectrum, infrared and other wireless media 320.

The computing device 320 may communicate with other devices 310, 350 over a communications media 320 using communications signals 322 via the communications component 340.

In some embodiments, and in particular reference to FIGS. 1A, 1B, the processing component 330 may comprise all or some of the isolation application 102, the domain name component 110, the receiving component 120, the application identification component 130, the security component 140, and the application hosting component 150. In some embodiments, domain name component 110, receiving component 120, and hosting component 150 may make use of communications component 340 to receive domain name request 105 and request 125 and to send domain name response 115 and response 135. In some embodiments, devices 310 and 350 may correspond to client devices sending domain name request 105 or request 125 to the isolation system 100 and received domain name response 115 or response 135 from the isolation system 100. Devices 310 and 350 may generally correspond to client devices used by users of the web page containing one or more embedded web applications 104-a. In this use scenario, the computing device 320 may comprise a server or server blade for a server array accessible by the server 172 hosting the web site 174 with various installed web applications 104-1, 104-2, 104-3 to access isolation services provided by the isolation system 100.

Figure 4:
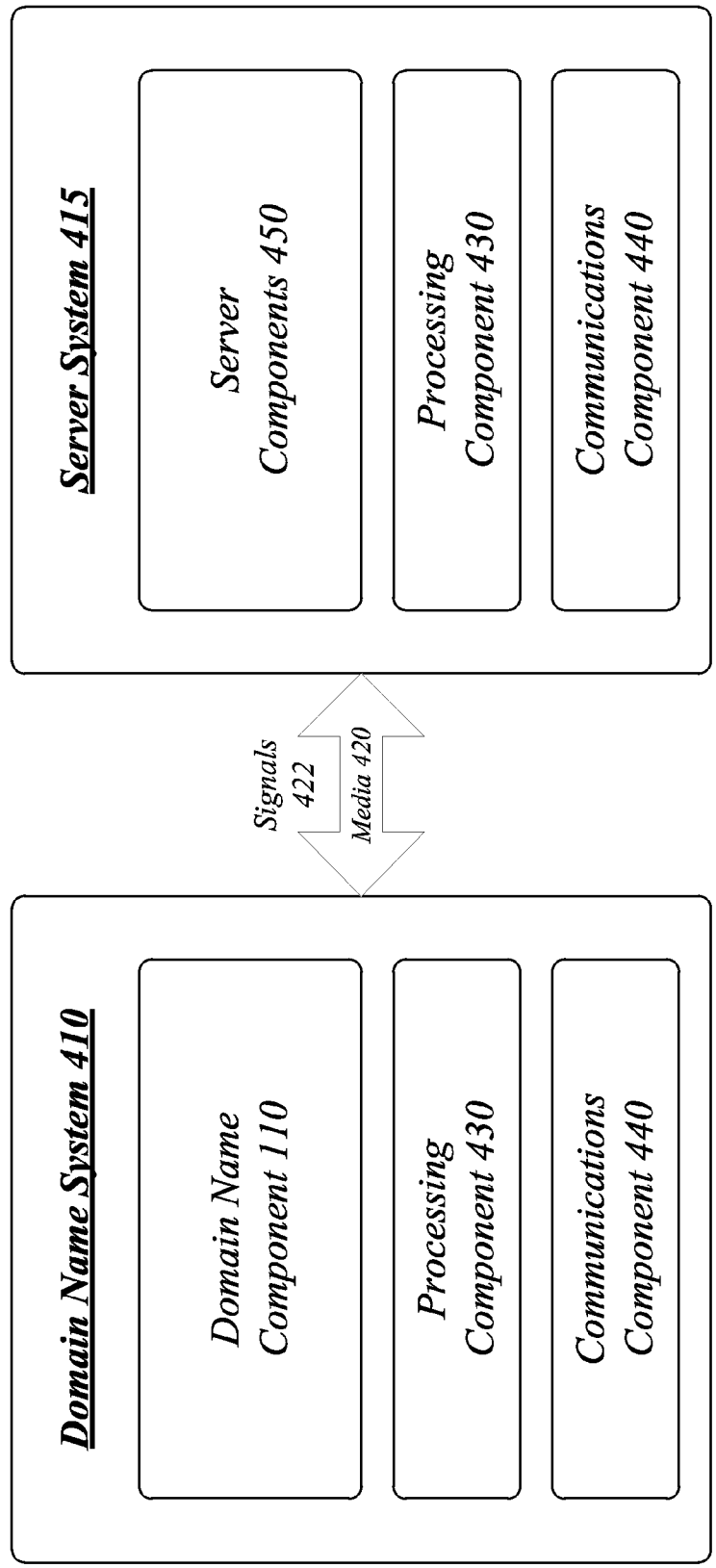
FIG. 4 illustrates an embodiment of a distributed system for dynamic domain-based isolation.

FIG. 4 illustrates a block diagram of a distributed system 400. The distributed system 400 may distribute portions of the structure and/or operations for the systems 100, 300 across multiple computing entities. Examples of distributed system 400 may include without limitation a client-server architecture, a 3-tier architecture, an N-tier architecture, a tightly-coupled or clustered architecture, a peer-to-peer architecture, a master-slave architecture, a shared database architecture, and other types of distributed systems. The embodiments are not limited in this context.

The domain name system 410 and the server system 415 may process information using the processing components 430, which are similar to the processing component 330 described with reference to FIG. 3. The domain name system 410 and the server system 415 may communicate with each other over a communications media 420 using communications signals 422 via communications components 440, which are similar to the communications component 340 described with reference to FIG. 3.

The domain name system 410 may comprise or implement the domain name component 110 of the isolation system 100. The server system 415 may implement other portions of the isolation system 100 as server components 450, which may comprise all or some of the receiving component 120, the application identification component 130, the security component 140, and the application hosting component 150. It will be appreciated that all or some of receiving component 120, application identification component 130, security component 140, and application hosting component 150 may be implemented on different computing devices in alternative embodiments. It should be appreciated that in many embodiments, while the domain name system 410 may also perform traditional domain name resolution tasks, that the domain name component 110 may perform tasks as an integrated part of the isolation system 100, wherein it assists in the process of assigning and resolving the uniform resource locators of web applications, and in particular the process of resolving wildcard entries beyond those supported by conventional domain name systems. The embodiments are not limited in this context.

Signals 422 sent over media 420 may correspond to signals implementing the coordination between the domain name system 410 and the server system 415. For instance, once a user is registered with the hosting entity, both the domain name system 410 and the server system 415 will make use of the user-specific identifier assigned to the user.

In various embodiments, the domain name system 410 may comprise or employ one or more computing devices and/or programs that operate to perform various methodologies in accordance with the described embodiments. It will be appreciated that a number of different methods exist for implementing a domain name system 410 consistent with the above-described embodiments.

In various embodiments, the server system 415 may comprise or employ one or more server computing devices and/or server programs that operate to perform various methodologies in accordance with the described embodiments. For example, when installed and/or deployed, a server program may support one or more server roles of the server computing device for providing certain services and features. Exemplary server systems 45 may include, for example, stand-alone and enterprise-class server computers operating a server OS such as a MICROSOFT® OS, a UNIX® OS, a LINUX® OS, or other suitable server-based OS. Exemplary server programs may include, for example, social network system (SNS) programs, web technology programs, web applications 104-a, web services, web hosting server programs, communications server programs such as Microsoft® Office Communications Server (OCS) for managing incoming and outgoing messages, messaging server programs such as Microsoft® Exchange Server for providing unified messaging (UM) for e-mail, voicemail, VoIP, instant messaging (IM), group IM, enhanced presence, and audio-video conferencing, and/or other types of programs, applications, or services in accordance with the described embodiments.

Figure 5:
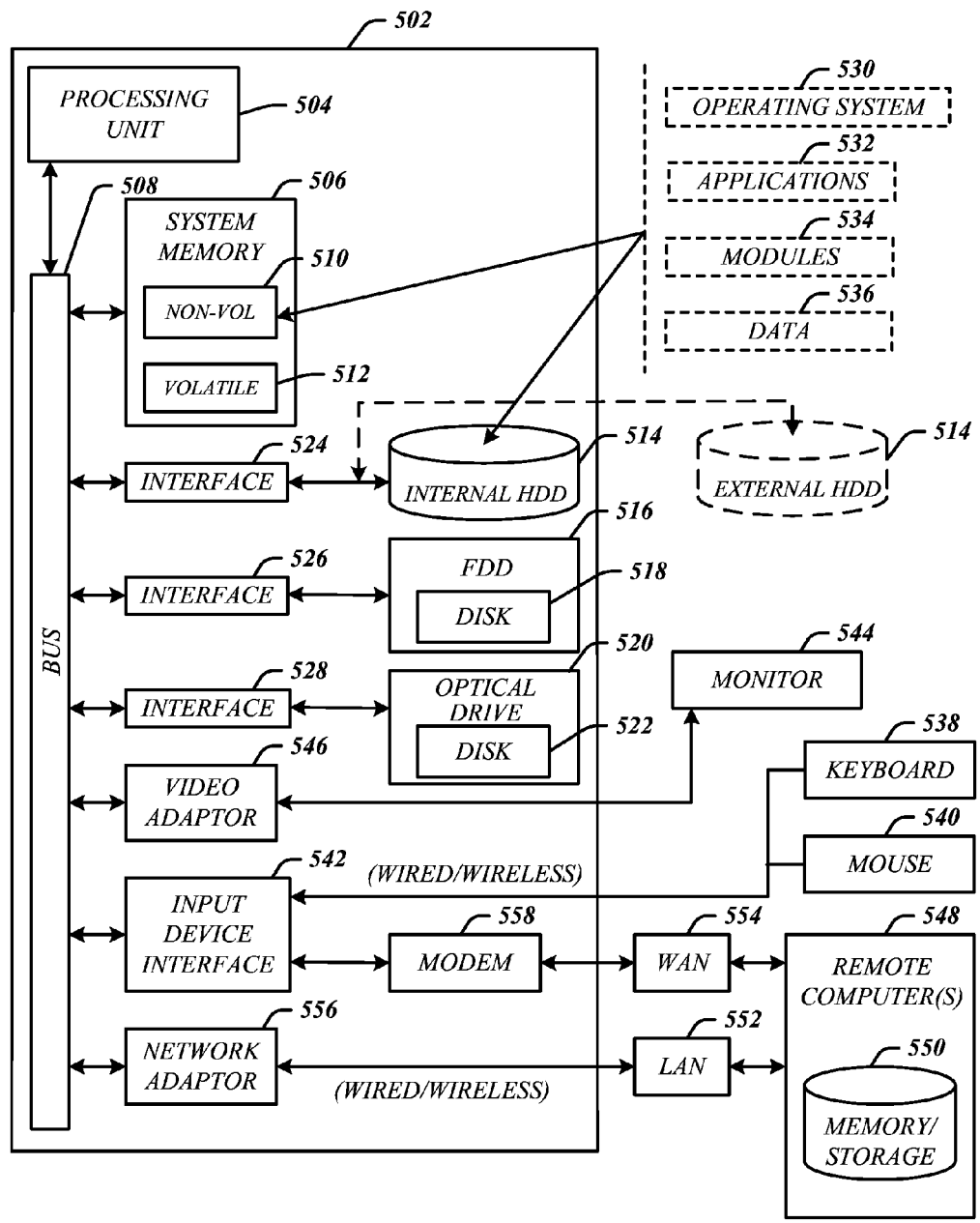
FIG. 5 illustrates an embodiment of a computing architecture suitable for dynamic domain-based isolation.

FIG. 5 illustrates an embodiment of an exemplary computing architecture 500 suitable for implementing various embodiments as previously described. As used in this application, the terms "system" and "component" are intended to refer to a computer-related entity, either hardware, a combination of hardware and software, software, or software in execution, examples of which are provided by the exemplary computing architecture 500. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers. Further, components may be communicatively coupled to each other by various types of communications media to coordinate operations. The coordination may involve the uni-directional or bi-directional exchange of information. For instance, the components may communicate information in the form of signals communicated over the communications media. The information can be implemented as signals allocated to various signal lines. In such allocations, each message is a signal. Further embodiments, however, may alternatively employ data messages. Such data messages may be sent across various connections. Exemplary connections include parallel interfaces, serial interfaces, and bus interfaces.

In one embodiment, the computing architecture 500 may comprise or be implemented as part of an electronic device. Examples of an electronic device may include without limitation a mobile device, a personal digital assistant, a mobile computing device, a smart phone, a cellular telephone, a handset, a one-way pager, a two-way pager, a messaging device, a computer, a personal computer (PC), a desktop computer, a laptop computer, a notebook computer, a handheld computer, a tablet computer, a server, a server array or server farm, a web server, a network server, an Internet server, a work station, a mini-computer, a main frame computer, a supercomputer, a network appliance, a web appliance, a distributed computing system, multiprocessor systems, processor-based systems, consumer electronics, programmable consumer electronics, television, digital television, set top box, wireless access point, base station, subscriber station, mobile subscriber center, radio network controller, router, hub, gateway, bridge, switch, machine, or combination thereof. The embodiments are not limited in this context.

The computing architecture 500 includes various common computing elements, such as one or more processors, co-processors, memory units, chipsets, controllers, peripherals, interfaces, oscillators, timing devices, video cards, audio cards, multimedia input/output (I/O) components, and so forth. The embodiments, however, are not limited to implementation by the computing architecture 500.

As shown in FIG. 5, the computing architecture 500 comprises a processing unit 504, a system memory 506 and a system bus 508. The processing unit 504 can be any of various commercially available processors. Dual microprocessors and other multi-processor architectures may also be employed as the processing unit 504. The system bus 508 provides an interface for system components including, but not limited to, the system memory 506 to the processing unit 504. The system bus 508 can be any of several types of bus structure that may further interconnect to a memory bus (with or without a memory controller), a peripheral bus, and a local bus using any of a variety of commercially available bus architectures.

The computing architecture 500 may comprise or implement various articles of manufacture. An article of manufacture may comprise a computer-readable storage medium to store logic. Examples of a computer-readable storage medium may include any tangible media capable of storing electronic data, including volatile memory or non-volatile memory, removable or non-removable memory, erasable or non-erasable memory, writeable or re-writeable memory, and so forth. Examples of logic may include executable computer program instructions implemented using any suitable type of code, such as source code, compiled code, interpreted code, executable code, static code, dynamic code, object-oriented code, visual code, and the like.

The system memory 506 may include various types of computer-readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, or any other type of media suitable for storing information. In the illustrated embodiment shown in FIG. 5, the system memory 506 can include non-volatile memory 510 and/or volatile memory 512. A basic input/output system (BIOS) can be stored in the non-volatile memory 510.

The computer 502 may include various types of computer-readable storage media in the form of one or more lower speed memory units, including an internal hard disk drive (HDD) 514, a magnetic floppy disk drive (FDD) 516 to read from or write to a removable magnetic disk 518, and an optical disk drive 520 to read from or write to a removable optical disk 522 (e.g., a CD-ROM or DVD). The HDD 514, FDD 516 and optical disk drive 520 can be connected to the system bus 508 by a HDD interface 524, an FDD interface 526 and an optical drive interface 528, respectively. The HDD interface 524 for external drive implementations can include at least one or both of Universal Serial Bus (USB) and IEEE 1394 interface technologies.

The drives and associated computer-readable media provide volatile and/or nonvolatile storage of data, data structures, computer-executable instructions, and so forth. For example, a number of program modules can be stored in the drives and memory units 510, 512, including an operating system 530, one or more application programs 532, other program modules 534, and program data 536.

The one or more application programs 532, other program modules 534, and program data 536 can include, for example, isolation application 102, domain name component 110, receiving component 120, application identification component 130, security component 140, and application hosting component 150.

A user can enter commands and information into the computer 502 through one or more wire/wireless input devices, for example, a keyboard 538 and a pointing device, such as a mouse 540. Other input devices may include a microphone, an infra-red (IR) remote control, a joystick, a game pad, a stylus pen, touch screen, or the like. These and other input devices are often connected to the processing unit 504 through an input device interface 542 that is coupled to the system bus 508, but can be connected by other interfaces such as a parallel port, IEEE 1394 serial port, a game port, a USB port, an IR interface, and so forth.

A monitor 544 or other type of display device is also connected to the system bus 508 via an interface, such as a video adaptor 546. In addition to the monitor 544, a computer typically includes other peripheral output devices, such as speakers, printers, and so forth.

The computer 502 may operate in a networked environment using logical connections via wire and/or wireless communications to one or more remote computers, such as a remote computer 548. The remote computer 548 can be a workstation, a server computer, a router, a personal computer, portable computer, microprocessor-based entertainment appliance, a peer device or other common network node, and typically includes many or all of the elements described relative to the computer 502, although, for purposes of brevity, only a memory/storage device 550 is illustrated. The logical connections depicted include wire/wireless connectivity to a local area network (LAN) 552 and/or larger networks, for example, a wide area network (WAN) 554. Such LAN and WAN networking environments are commonplace in offices and companies, and facilitate enterprise-wide computer networks, such as intranets, all of which may connect to a global communications network, for example, the Internet.

When used in a LAN networking environment, the computer 502 is connected to the LAN 552 through a wire and/or wireless communication network interface or adaptor 556. The adaptor 556 can facilitate wire and/or wireless communications to the LAN 552, which may also include a wireless access point disposed thereon for communicating with the wireless functionality of the adaptor 556.

When used in a WAN networking environment, the computer 502 can include a modem 558, or is connected to a communications server on the WAN 554, or has other means for establishing communications over the WAN 554, such as by way of the Internet. The modem 558, which can be internal or external and a wire and/or wireless device, connects to the system bus 508 via the input device interface 542. In a networked environment, program modules depicted relative to the computer 502, or portions thereof, can be stored in the remote memory/storage device 550. It will be appreciated that the network connections shown are exemplary and other means of establishing a communications link between the computers can be used.

The computer 502 is operable to communicate with wire and wireless devices or entities using the IEEE 802 family of standards, such as wireless devices operatively disposed in wireless communication (e.g., IEEE 802.11 over-the-air modulation techniques) with, for example, a printer, scanner, desktop and/or portable computer, personal digital assistant (PDA), communications satellite, any piece of equipment or location associated with a wirelessly detectable tag (e.g., a kiosk, news stand, restroom), and telephone. This includes at least Wi-Fi (or Wireless Fidelity), WiMax, and Bluetooth™ wireless technologies. Thus, the communication can be a predefined structure as with a conventional network or simply an ad hoc communication between at least two devices. Wi-Fi networks use radio technologies called IEEE 802.11x (a, b, g, n, etc.) to provide secure, reliable, fast wireless connectivity. A Wi-Fi network can be used to connect computers to each other, to the Internet, and to wire networks (which use IEEE 802.3-related media and functions).

Figure 6:
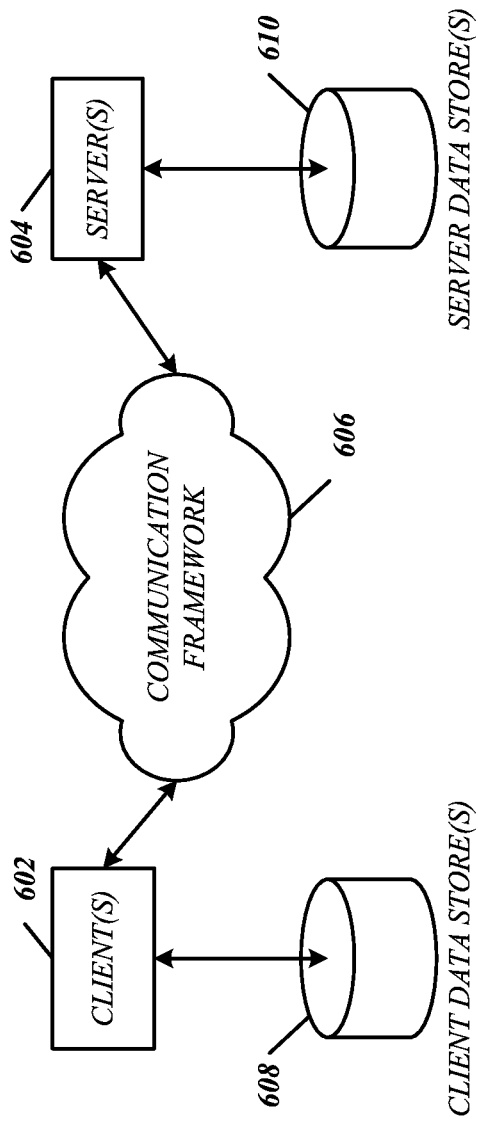
FIG. 6 illustrates an embodiment of a communications architecture suitable for dynamic domain-based isolation.

FIG. 6 illustrates a block diagram of an exemplary communications architecture 600 suitable for implementing various embodiments as previously described. The communications architecture 600 includes various common communications elements, such as a transmitter, receiver, transceiver, radio, network interface, baseband processor, antenna, amplifiers, filters, and so forth. The embodiments, however, are not limited to implementation by the communications architecture 600.

As shown in FIG. 6, the communications architecture 600 comprises includes one or more clients 602 and servers 604. The clients 602 may implement the client systems 310 and 350. The servers 604 may implement the isolation system 100, the server system 415, or the domain name system 410. The clients 602 and the servers 604 are operatively connected to one or more respective client data stores 608 and server data stores 610 that can be employed to store information local to the respective clients 602 and servers 604, such as cookies and/or associated contextual information.

The clients 602 and the servers 604 may communicate information between each other using a communication framework 606. The communications framework 606 may implement any well-known communications techniques and protocols, such as those described with reference to systems 100, 300, and 400. The communications framework 606 may be implemented as a packet-switched network (e.g., public networks such as the Internet, private networks such as an enterprise intranet, and so forth), a circuit-switched network (e.g., the public switched telephone network), or a combination of a packet-switched network and a circuit-switched network (with suitable gateways and translators).

Some embodiments may be described using the expression "one embodiment" or "an embodiment" along with their derivatives. These terms mean that a particular feature, structure, or characteristic described in connection with the embodiment is included in at least one embodiment. The appearances of the phrase "in one embodiment" in various places in the specification are not necessarily all referring to the same embodiment. Further, some embodiments may be described using the expression "coupled" and "connected" along with their derivatives. These terms are not necessarily intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

It is emphasized that the Abstract of the Disclosure is provided to allow a reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims.

The invention claimed is:

1. An apparatus, comprising:
 a logic device;
 a receiving component operative on the logic device to receive, at a host web server from a client, a request for a web application hosted by the host web server at a uniform resource locator, the uniform resource locator having a domain separate from a domain of the host web server dynamically assigned to the web application during installation of the web application wherein the domain name includes a user-specific identifier which uniquely identifies a user and an application identifier;
 an application identification component operative at the host web server to determine which hosted web application of a plurality of hosted web applications corresponds to the requested web application on the basis of the uniform resource locator; and
 a domain generator component operative on the logic device to generate and dynamically assign the uniform resource locator to the web application during installation of the web application; and
 a security component operative on the logic device to determine a set of security permissions for the web application, the security component operative to apply the security permissions to the received request.

2. The apparatus of claim 1, comprising a domain name component operative on the logic device to receive a domain name request for the uniform resource locator, and resolve the domain name request based on a wildcard entry in a domain name table.

3. The apparatus of claim 2, the wildcard entry in the domain name table comprising a single entry for a plurality of applications, wherein a unique uniform resource locator was dynamically assigned for each of the plurality of applications, the wildcard entry comprising a subdomain with an identifier portion and a wildcard portion.

4. The apparatus of claim 1, comprising an application hosting component operative on the logic device to return a response to the request using the web application.

5. The apparatus of claim 1, the web application comprising a script-based application accessible via a web browser.

6. A method, comprising:
 receiving at a host web server a request for a web application hosted by the host web server at a uniform resource locator, the uniform resource locator including a domain separate from a domain of the host web server and having been dynamically assigned to the web application by a hosting entity of the host web server at a time of installation wherein the uniform resource locator includes a domain name having a user-specific identifier which uniquely identifies the user and an application identifier;
 determining at the host web server which hosted web application of a plurality of hosted web applications corresponds to the requested web application on the basis of the uniform resource locator;
 returning a response to the request using the web application;
 determining a set of security permissions for the web application; and applying the security permissions to the received request wherein the uniform resource locator is dynamically assigned to the web application at installation.

7. The method of claim 6, comprising:
receiving a domain name request for the uniform resource locator the plurality of hosted web applications having different domains; and
resolving the domain name request based on a wildcard entry in a domain name table.

8. The method of claim 7, the wildcard entry in the domain name table comprising a single entry for a plurality of applications for a user, wherein a unique uniform resource locator was dynamically assigned for each of the plurality of applications, the wildcard entry comprising a subdomain with an identifier portion and a wildcard portion.

9. An article of manufacture comprising a storage memory unit containing instructions that when executed cause a system to:
receive a domain name request for a uniform resource locator;
resolve the domain name request based on a wildcard entry in a domain name table;
receive a request for a web application hosted by the host web server at the uniform resource locator, the uniform resource locator including a sub-domain of a domain of the host web server and having been dynamically assigned to a particular web application by a hosting entity of the host web server, the domain name comprising a user-specific identifier which uniquely identifies the user and an application identifier, the application identifier having been generated for the web application at installation; and
determine at the host web server which hosted web application of a plurality of hosted web applications corresponds to the requested web application on the basis of the uniform resource locator;
determine a set of security permissions for the web application; and
apply the security permissions to the received request wherein the uniform resource locator is dynamically assigned to the web application at installation.

10. The article of claim 9, the wildcard entry in the domain name table comprising a single entry for a plurality of applications for a user, wherein a unique uniform resource locator was dynamically assigned for each of the plurality of applications, the wildcard entry comprising a subdomain with an identifier portion and a wildcard portion.

11. The article of claim 9, further comprising instructions that when executed cause the system to return a response to the request using the web application.

* * * * *